United States Patent Office 3,322,073
Patented May 30, 1967

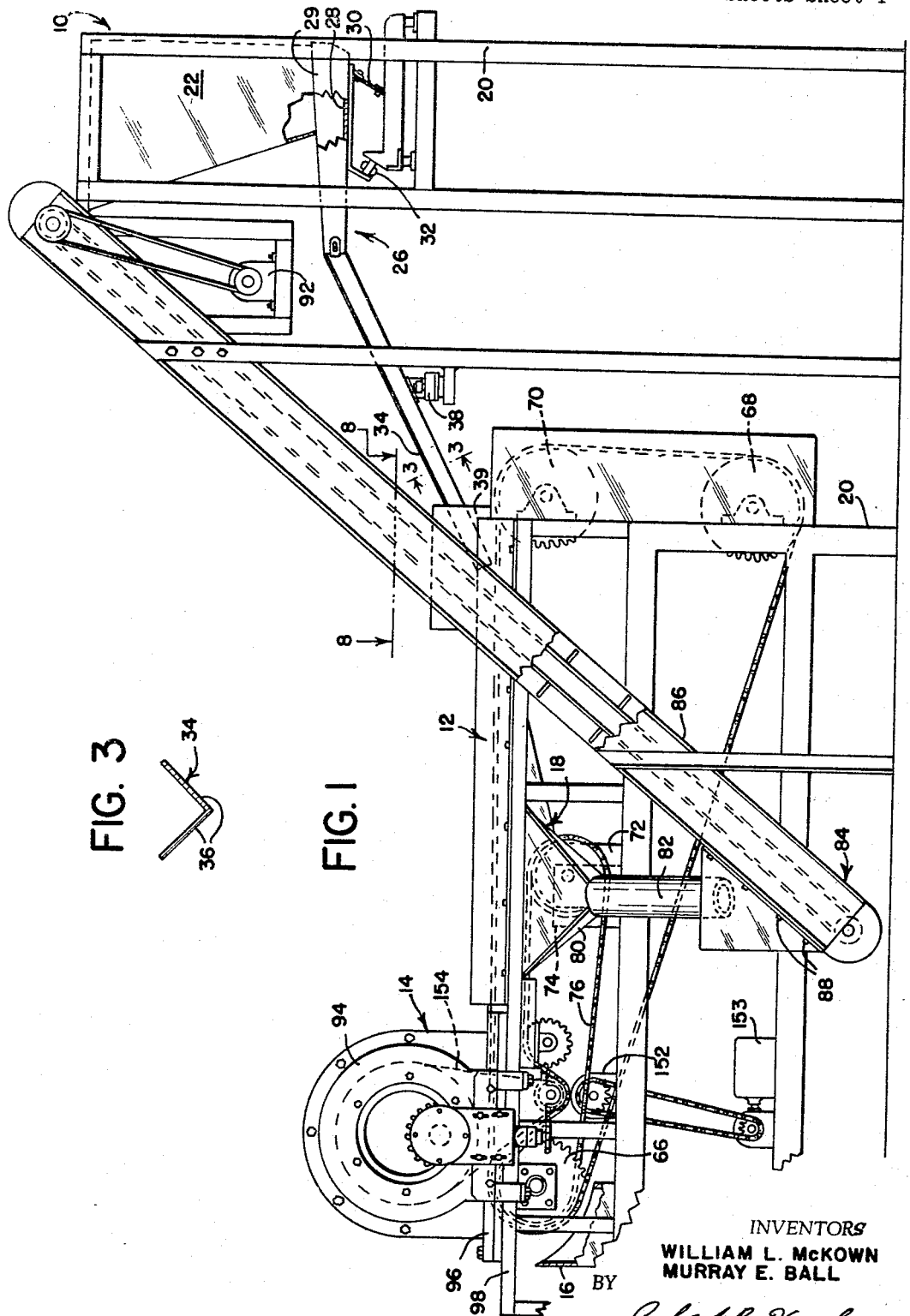

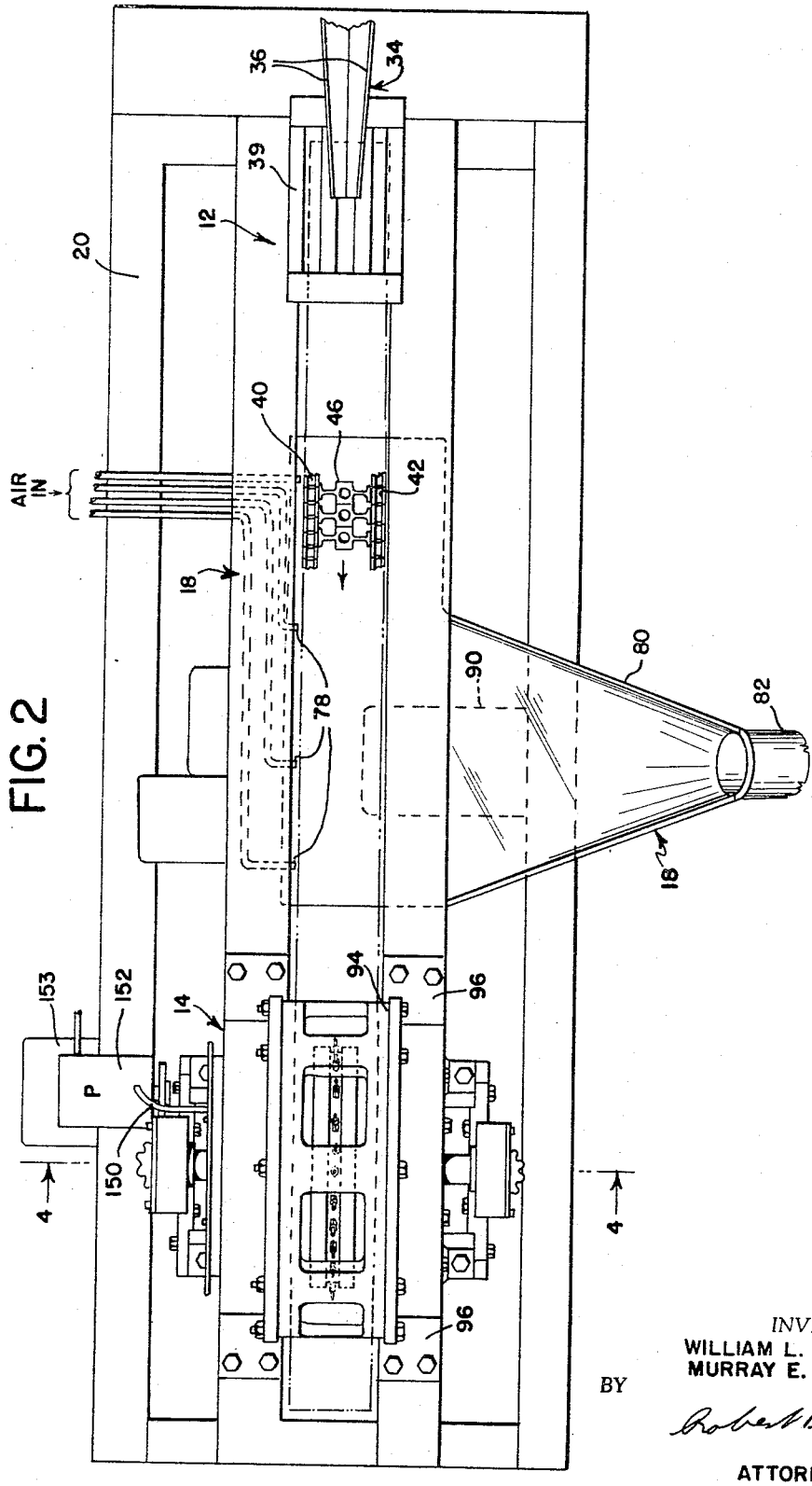

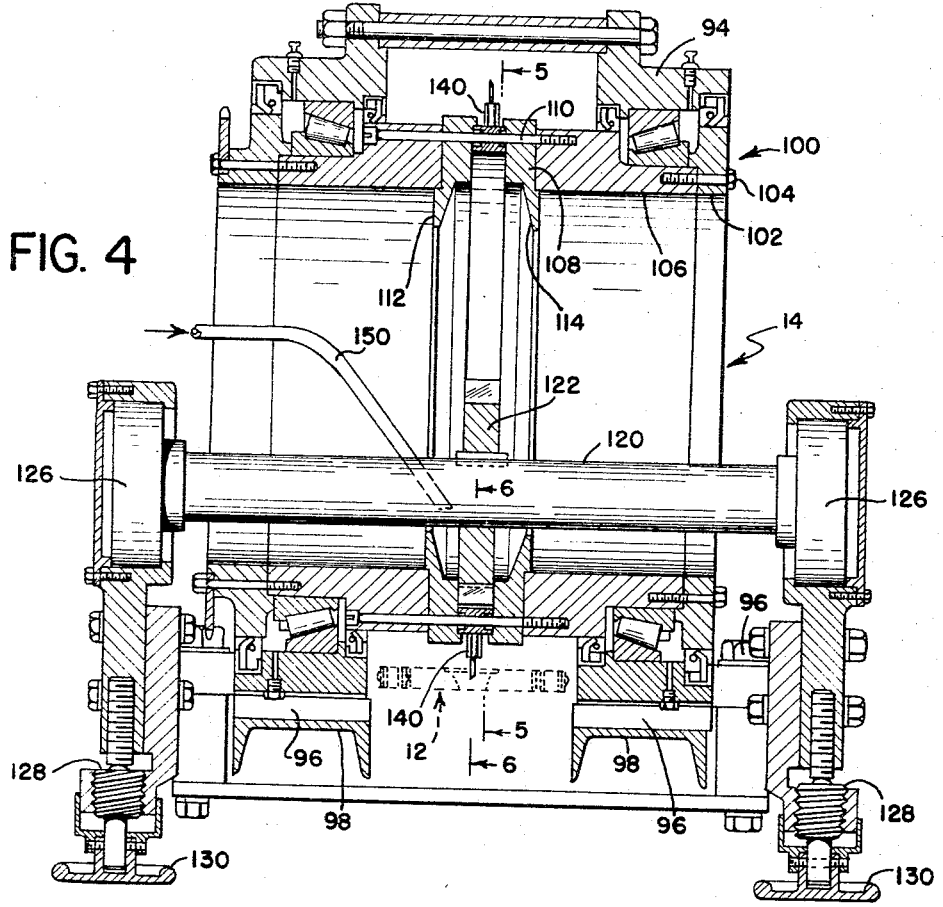

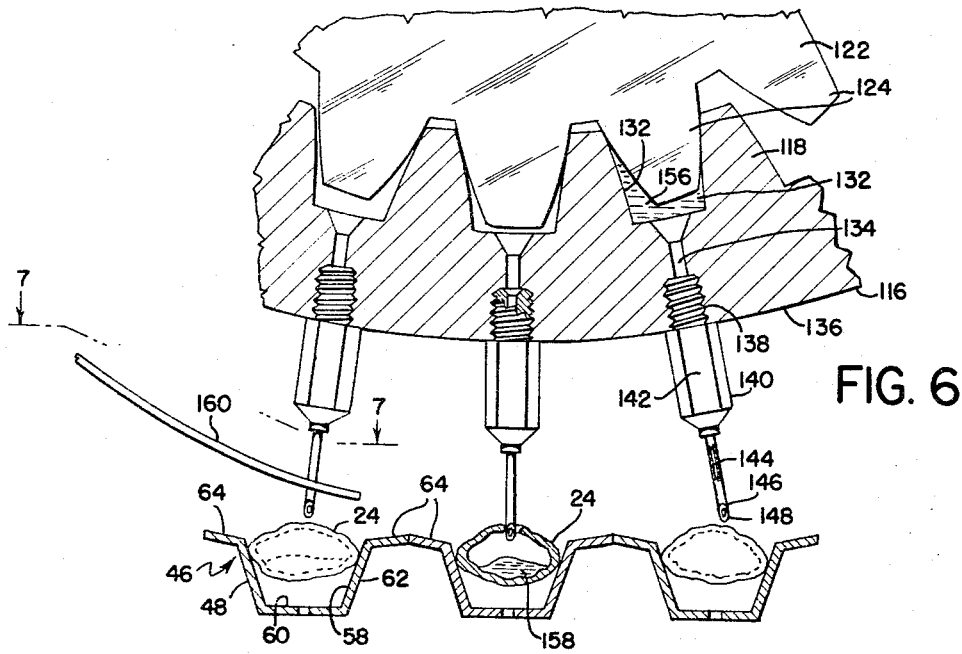
FIG. 6
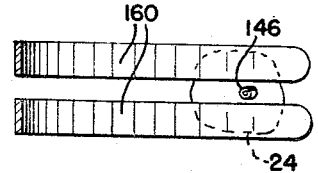
FIG. 7
FIG. 8
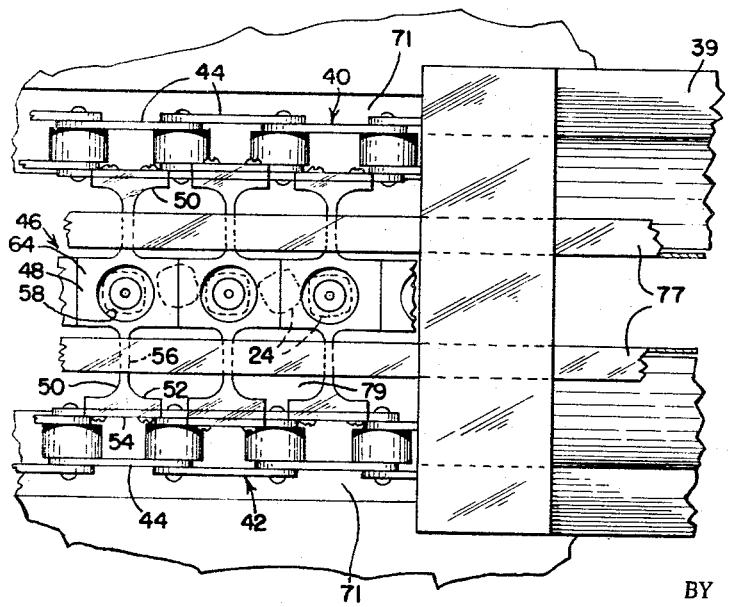
INVENTORS
WILLIAM L. McKOWN
MURRAY E. BALL
BY
ATTORNEY

3,322,073
MATERIAL APPLYING APPARATUS
William L. McKown, St. Louis Park, and Murray E. Ball, Rockford, Minn., assignors to General Mills, Inc., a corporation of Delaware
Filed May 28, 1965, Ser. No. 459,774
10 Claims. (Cl. 107—1)

The present invention relates generally to applying material to a plurality of pieces or units, and more particularly to an apparatus especially adapted for injecting charges of a flowable or liquid material into hollow pieces.

The specific problem which provided the stimulus for the creation of the present invention was that of accomplishing a step in a process described in a pending United States patent application, entitled, "Food Product and Process," Ser. No. 393,632, filed Sept. 1, 1964, which application is assigned to the assignee of the present invention. Accordingly, it is believed that a better appreciation of the present invention can be attained by first describing generally the above-mentioned process and somewhat more specifically the difficulties involved in accomplishing the specific step therein to which the present invention relates, and then describing in detail the apparatus of the present invention and the manner in which it functions to accomplish that processing step.

The above-mentioned process is directed to the making of a ready-to-eat breakfast cereal in which each of the individual pieces or units comprises an outer cereal shell containing a foamed filler material. In the preferred embodiment of that process, a cooked dough is formed into a plurality of dual-layered, cooked dough pellets, which are dried and then puffed to form finished, generally pillow-shaped, hollow cereal biscuits. A charge of a syrupy filler material is injected into each of these biscuits, after which the biscuits with the filler are further processed to puff and dry the filler material within the biscuits, with the resulting product being a finished ready-to-eat breakfast cereal.

The present invention was devised to accomplish on a commercial scale the injection of the filler material into the finished cereal biscuits. This entails orienting or locating the cereal biscuits into some predetermined arrangement according to which the filler material can be injected into the biscuits. The finished puffed cereal biscuits themselves are lightweight and have a somewhat delicate texture, and the filler material is a sticky, syrup-like material, only a relatively small charge of which is injected into each cereal biscuit cavity. Thus it is important that care be taken to minimize any tendency to break the biscuits and also to fill the biscuits with a high degree of reliability in that substantially all the biscuits are filled and the filler is not discharged carelessly. Not only is this desirable from a standpoint of quality control in that the end product should be such that each biscuit is intact with the proper amount of filler material therein and does not have its outside surface smeared with filler material, but also from the standpoint of maintaining an effective operation. With the individual cereal units or biscuits being at least as small as spoon size or desirably somewhat smaller, it is understandable that the above-mentioned problems become intensified when it is desired to accomplish this processing step at a rate of output necessary for a full scale commercial operation.

In view of the foregoing, it is an object of the present invention to provide a new and improved apparatus for applying to a plurality of pieces, charges of a flowable material.

It is a more specific object to provide such an apparatus wherein a plurality of pieces or units are oriented according to a predetermined pattern and moved in a continuous manner past a location where the flowable material is applied in an especially effective manner to said pieces according to the arrangement and movement thereof.

More particularly, it is an object to provide in this apparatus novel means to discharge said flowable material with a relatively high degree of precision with respect to the amount of material discharged, the timed relationship between the discharging of the flowable material and the movement of the pieces or units, and the manner in which said flowable material is applied to each piece.

A further object is to provide such an apparatus especially adapted to accomplish in a full scale commercial operation the insertion of a flowable material into a plurality of units such as hollow cereal biscuits so as to solve in a particularly effective manner the difficulties of accomplishing the same.

These and other objects and features of the invention will be more readily understood and appreciated from the following detailed description of the preferred embodiments thereof selected for purposes of illustration and shown in the accompanying drawings, in which:

FIGURE 1 is a side elevational view of the apparatus of the present invention;

FIG. 2 is a top plan view thereof, drawn to an enlarged scale;

FIG. 3 is a transverse sectional view taken on line 3—3 of FIG. 2;

FIG. 4 is a transverse sectional view taken on line 4—4 of FIG. 1;

FIG. 5 is a longitudinal sectional view drawn semi-schematically and taken on line 5—5 of FIG. 4;

FIG. 6 is a sectional view taken on line 6—6 but drawn to an enlarged scale and showing in more detail that portion of the apparatus proximate the filling location thereof;

FIG. 7 is a sectional view along line 7—7 of FIG. 6; and

FIG. 8 is a fragmentary plan view taken generally along line 8—8 of FIG. 1.

Since the specific embodiment of the apparatus shown herein was designed specifically to accomplish the filler inserting step in the breakfast cereal making process disclosed previously herein, it is believed that the components of the present invention can best be described and designated according to the function which they serve in that aforedescribed process.

In general, the apparatus of the present invention comprises a biscuit feeding unit 10, which, as its name implies, feeds the individual biscuits to an endless conveyor 12 which in turn carries the biscuits forward to a filling location at the forward end of the apparatus. At this filling location is a filler mechanism 14 which functions to insert into each of the biscuits a predetermined charge of a filler material, after which the filled biscuits are discharged into a suitable collector 16. Since, in the operation of this apparatus, not all of the biscuits discharged from the feed mechanism 10 are immediately oriented into the conveyor 12, there is further provided removal means, generally designated 18, to move the excess biscuits from the conveyor 12 and carry the same back to the feeding mechanism 10 from which they can again be fed to the conveying mechanism 12.

There is provided a base frame 20 by which the components of the present invention are mounted. At the upper end of this base frame 20 is provided a feed hopper 22 of the feed mechanism 10, which hopper 22 discharges finished hollow cereal biscuits 24 onto the rear end of a vibratory conveyor 26. This conveyor 26 comprises a conveying platform 28 with an upstanding wall 29 extending along the rear and side edges thereof and reaching above the discharge end of the hopper 22. The conveyor 26 is supported from a relatively stiff, flat spring 30, the upper end of which is fixedly secured to the bottom of the conveyor 26 and the lower end of which is fixedly mounted to the base frame 20. This spring 30 is so disposed that it slants upwardly and rearwardly so that the conveyor 26 is able to oscillate along a path upwardly and forwardly and then downwardly and rearwardly, and an oscillator 32 is provided to impart such a vibratory motion to the conveyor 26 and thus cause the biscuits 24 to be conveyed in a forward direction along the conveyor 26. By varying the electric current to the oscillator the rate at which the biscuits 24 are conveyed from the hopper 24 and along the conveyor 26 can be modified.

As the biscuits 24 travel off the front end of the conveyor 26, they drop onto the rear end of a downwardly and forwardly sloping trough 34, formed of two side walls 36 so as to have a V-shaped cross sectional configuration (see FIG. 3). The rear end of the trough is only loosely connected to the conveyor 26 and the front or discharge end of the trough 34 is located just above the conveyor 12 and is aligned with the centerline thereof, the front end of the trough 34 being supported by a suitable framework 39. This trough 34 is oscillated to a moderate extent by a vibrator 38 to facilitate the downward travel of the biscuits 24, which because of the slope of the trough 34 accelerate on their downward path. The rate of discharge of the conveyor 26 is so controlled and the trough 34 is so arranged that the biscuits 24 fall into single file and are adjacent to one another by the time they reach the discharge end of the trough 34.

The conveyor 12 is an endless chain type conveyor and comprises a pair of parallel endless chains 40 and 42 located on opposite sides of the conveyor 12. Fixedly secured to and extending between each matching pair of links 44, one from each chain 40 and 42, is a respective one of a plurality of conveying elements 46. Each conveying element 46 is integral and is made up of a central biscuit carrying portion 48 and two T-shaped bracket portions 50 which extend in opposite directions laterally therefrom. The cross arm 52 of each T bracket 50 is secured to the inner arm 54 of its related link 44, while the stem portion 56 of each T bracket 50 reaches between its cross arm 52 to join to the central biscuit carrying portion 48.

The central biscuit carrying portion 48 of each element 46 has the overall configuration of a generally horizontally disposed rectangle, the central portion of which is depressed in a manner to form a biscuit carrying pocket or recess 58. This recess 58 is defined by a bottom wall 60 and a generally circular outwardly and upwardly extending side wall 62, the side wall 62 in effect having the configuration of an inverted truncated cone. That part of the central biscuit carrying portion 48 which surrounds the recess 58 can thus be described as a horizontal generally rectangular flange 64. It will be noted that the length (i.e., longitudinal dimension) of each central biscuit carrying portion 48 is equal to the length of each link 44, with the result that these portions 48 form a continuous longitudinally extending platform. The chain links 44 and the biscuit carrying portions 48 are so arranged in relation to the size of the biscuits 24 being conveyed as to be about double the crosswise dimension of each biscuit 24.

The conveyor 12 trains around a pair of front drive sprockets 66 each of which engages a respective one of the two chains 40 and 42. The conveyor 12 travels from this set of sprockets 66 rearwardly and slightly downwardly to a lower rear pair of idler sprockets 68, thence upwardly and around a rear upper set of sprockets 70 and travels therefrom in a horizontal path along its upper forward biscuit conveying run where it is supported by two channel beams 71 that engage a respective one of the two endless chains 40 and 42. To drive the conveyor 12, there is provided a motor 72 which through a speed reducing transmission 74 and chain and sprocket drive 76 transmits power to the front drive sprockets 66.

As indicated previously, the action of the conveyor 26 is so controlled through the oscillator 32, and the trough 34 is so arranged, that the rate of discharge from the trough 34 is such that as one biscuit 24 moves off the end of the trough 34 onto the conveyor 12 which then begins to carry the biscuit 24 at the linear rate of travel of the conveyor 12, the subsequent biscuit 24 being discharged from the trough 34 is immediately behind the preceding biscuit 24 and possibly presses against the same with a moderate pressure. Thus the linear rate of discharge of biscuits 24 is about the same as the linear rate of travel of the conveyor 12. As is best illustrated in FIG. 6, the forward and rear flange portions 64 of each conveying element 46 slope moderately downward toward the central biscuit carrying recess 58, so that a biscuit 24 which is discharged from the trough 34 onto an adjacent pair of such flange portions 64 tends to fall into the recess 58 either immediately in front or behind.

The effect is that as the biscuits 24 are fed from the trough 34 single file onto the biscuit carrying portions 48 of the conveying elements 46, one biscuit 24 will tend to fall into one of the recesses 58, and the succeeding biscuit 24 will tend to push its preceeding biscuit into such recess and remain itself on top of a pair of flange elements 64. Thus every second biscuit will fall into a related one of the recesses 58, while the remaining alternate biscuits remain on a proximate pair of flange elements 64 between the biscuits 24 which are so located in the recesses 58 (see FIG. 8). If one of the biscuits 24 does not fall into one of the recesses 58 according to this pattern, one of the proximate biscuits 24 will generally slip down a flange portion 64 into that recess 58. Two horizontal upstanding arms 77 extend forwardly from the discharge end of the trough 34 a moderate distance and are positioned one on each side of the row of pockets 58 to prevent the biscuits 24 from tumbling off to the side of the biscuit carrying portions 48, as the biscuits 24 come off the trough 34. (In FIG. 8, these two arms 77 are shown, for convenience of illustration, spaced further apart from one another than may normally be desired.)

Forward of the two guide arms 77 and at about the mid length of the upper run of the conveyor 12, there are a plurality of air jets 78 which are so arranged that the air streams issuing therefrom flow across the upper surface of the conveyor 12 so as to blow off the biscuits 24 which are situated on the conveyor 12 but are not located in the pockets 58 thereof. These biscuits 24 will ordinarily fall through the openings 79 between the stem portions 56 of each pair of conveying elements 46. To collect these biscuits 24 which are so blown off the conveyor 12, there is located below the middle portion of the conveyor 12 a hopper 80 which gathers the collected biscuits and discharges them through a conduit 82 onto the lower end of a recycling conveyor 84. This conveyor 84 comprises an endless belt 86 on which are mounted a plurality of upstanding arms 88 which carry the collected biscuits 24 upwardly to the top end of the conveyor 84 and discharge them into the aforementioned feed hopper 22. As shown herein, the hopper 80 and conduit 82 are secured one to another and are vibrated by an oscillator (indicated schematically at 90 in FIG. 2) to facilitate the discharge of the biscuits through the conduit 82 and onto the recycling conveyor 84. The conveyor is powered by suitable means such as the motor indicated at 92.

The aforementioned filler mechanism 14 is located just above the front portion of the conveyor 12, and comprises an annular housing 94, the center axis of which is horizontally and transversely disposed. This housing 94 is supported by means of mounting feet 96 which are in turn supported by two longitudinally extending channel beams 98 which are part of the main frame 20. Journal mounted within the housing 94 and concentric therewith is a rotor frame 100, which for convenience of manufacture and assembly is made up of six rings stacked side by side and bolted one to another to make a unitary frame. Thus there is a pair of outer rings 102 bolted at 104 to respective intermediate rings 106, which are in turn bolted one to another and to a pair of inner rings 108 by bolts 110.

Each of the inner rings 108 is formed with a respective one of two annular flanges 112 which extend radially inward in a manner to define therebetween an annular trough 114. Fixedly secured by the aforementioned bolts 110 between the two inner rings 108 is an internal gear member 116, the radially inwardly extending teeth of which are designated 118.

Mounted on a horizontal transverse shaft 120 for rotary motion about a transverse axis directly below and parallel to the axis of rotation of the internal gear 116 is a spur gear member 122, whose radially outwardly extending teeth 124 mesh with the teeth 118 of the gear 116 at the lowermost location of the gear 116. Each end of the shaft 120 is journal mounted from a respective one of two vertically adjustable bearings 126, each of which comprises a screw adjustment device 128 operated by a knob 130. Thus by adjusting the height of the bearings 126, proper engagement of the internal gear 116 and its meshing spur gear 122 can be achieved.

As illustrated in FIG. 6, each proximate pair of teeth 118 of the internal gear 116 define a recess 132 into which a related one of the teeth 124 of the spur gear member 122 moves into and then recedes from as the gears 116 and 122 move in meshing engagement. Communicating with and extending from each such recess 132 is a respective passage 134 which opens to the peripheral face 136 of the gear member 116. The outer end of each passage 134 is threaded, as at 138, so that the base end of a respective injector member 140 may be secured therein.

Each such injector member 140 has an interior through passage, the inner part of which 142 communicates with its respective passage 134 in the gear member 116, and the outer part of which is a passage portion 144 of relatively small diameter defined by an outer needle portion 146 of the injector member 140. The terminal end 148 of each needle portion 146 is pointed so that it can properly pierce a biscuit 124 so as to be able to properly perform its injecting function.

Suitable liquid feed means, such as the tube shown at 150, is provided to discharge liquid filler material into the lower portion of the annular trough 114. To feed the liquid filler material to the tube 150, there is provided a pump 152 driven from a motor 153, the volumetric flow of which pump 152 can be controlled within sufficiently accurate limits so that the proper amount of liquid filler material is fed into the trough 114 during the operation of this apparatus. The centrifugal force exerted on the filler in the trough 114 because of the rotation of the rotor frame 100 is sufficient to keep the filler material spread about the entire annular trough 114.

In operation, finished cereal biscuits 24 are placed in the feed hopper 22, and are moved along the conveyor 26 and down the trough 34 onto the forward traveling upper run of the conveyor 12. As indicated previously herein, the components of the feed mechanism 10 are so arranged and operated that the rate of feed (in terms of linear rate of travel of a single file of biscuits positioned one against the other) is substantially the same as the rate of travel of the conveyor 12. The effect is that about half of the biscuits 24 find their way into the pockets 58 of the conveying elements 46, while the rest of the biscuits rest on the flange portions 64 of the conveying elements 46. As the biscuits 24 are carried forward by the conveyor 12, those biscuits 24 which are not oriented into conveying pockets 58 are blown off the conveyor by the air jets 78 and collected by the hopper 80 to be moved by the recycling conveyor 84 back to the feed hopper 22.

The rotor member 100 rotates at an angular speed such that the linear speed of any point on a circumference defined by the end tips 48 of the injector needles 146 is exactly equal to the linear rate of travel of the conveyor 12. This is conveniently accomplished by driving the rotor frame 100 by a chain and sprocket drive 154 that is in turn driven from the aforementioned chain and sprocket drive 76 that moves the conveyor 12. Thus as each injector member 140 moves forwardly and downwardly toward its lowermost point in its path of travel, the end portion 148 of its injector needle 146 comes into contact with a related biscuit 24 located in a conveying pocket 58. As the needle end 148 pushes through the shell of the biscuit 24 so as to communicate with the hollow interior thereof, a gear tooth 124 has come into such engagement with the related gear recess 132 so as to close it off from the remaining liquid in the trough 114. The effect is that the portion of liquid filler material (shown only at one location at 156 in FIG. 6) which is entrapped in the recess 132 is pushed outwardly through the passage 134 and through the needle passages 142 and 144 and into the interior of the related biscuit 124 (shown at 158 in FIG. 6). When the injector member 140 reaches its lowermost path of travel, the discharge of its filler material portion is complete, and the needle 146 begins to withdraw from the biscuit 24.

Ordinarily the biscuits 24 remain in the pockets 58 until the conveyor 12 passes around the two front sprockets 66, at the location of which the biscuits 24 by gravitational and centrifugal force fall from the conveyor 12 into the collector 16. To provide for the occasional sticking of the biscuits 24 to the injector needles 146, there is provided a pair of arms 160, the rear ends of which extend on each side of the needle 146 as it begins its upward path of travel from the filling location. As the arms 160 extend forwardly, they progress radially outward from the axis of rotation of the rotor frame 100, and thus push the biscuits 24 off the needles 146 so that they may fall into the collector hopper 16.

For convenience, only one filler line has been illustrated herein. However, it is to be understood that various elements of this apparatus could be duplicated several times over and placed in proximate side by side relationship to multiply the rate of output. Thus one conveyor 26 could feed a number of side-by-side troughs 34; each conveyor element 46 could provide an equal number of pockets 58 in side by side relationship; and an equal number of sets of injector elements 140 with their associated gear members 116 and 122 could be provided in the rotor frame 100 and on the shaft 120.

It should be understood that the foregoing is merely illustrative of a certain embodiment of the invention and many variations may be made by those skilled in the art without departing from the spirit and scope of the invention.

Now therefore we claim:

1. An apparatus for applying a flowable material to a plurality of units, said apparatus comprising:
   (a) a first gear member having a plurality of interiorly facing gear teeth, proximate pairs of which define respective material carrying recesses, said gear member being mounted for rotation about a first generally tranverse axis,
   (b) said first gear member being provided with a plurality of discharge means, each of which defines a respective discharge outlet which opens to the exterior of said first gear member and communicates with a related one of said recesses,
   (c) a pinion gear member disposed within said first gear member in meshing engagement therewith and mounted for rotational movement about a second generally transverse axis offset from said first transverse axis, so that teeth of said pinion gear force material from said recesses out said discharge outlets as they mesh with the gear teeth of said first gear member,
   (d) means to rotate said gear members at a predetermined rate of travel, and
   (e) conveying means to carry said units in a predetermined arrangement corresponding to that of the discharge outlets of said first gear member and to move said units at a predetermined rate of travel corresponding to the linear peripheral rate of travel of said first gear member and in timed relationship therewith along a path proximate to said first gear member at a location thereof where said first gear member meshes with said pinion gear member.

2. The apparatus as recited in claim 1, wherein each of said discharge means has at the outer end thereof outwardly extending injector means to penetrate said units as they travel along said path.

3. The apparatus as recited in claim 1, wherein said conveying means comprises an endless conveyor arranged to move at a predetermined rate of travel and comprising carrying elements defining a plurality of unit receiving pockets, and there is feed means to move said units onto said conveyor in general alignment with said pockets and at a linear feed rate generally the same as the linear rate of travel of said conveyor.

4. The apparatus as recited in claim 3, wherein said feed means is arranged to feed said units in linear, proximate relationship, and the pockets of said conveyor are spaced to receive alternate ones of said units.

5. The apparatus as recited in claim 4, wherein there is removal means to remove from said conveyor the units other than those which are oriented in the pockets of said conveyor, and there is recycling means to collect those units removed from said conveyor and to carry them back to said feed means.

6. The apparatus as recited in claim 5, wherein said removal means comprises means to direct an air stream over said conveyor.

7. The apparatus as recited in claim 3, wherein said conveyor travels a downwardly curving course after it moves past said first gear member, so that units carried by said conveyor are discharged from said conveyor.

8. The apparatus as recited in claim 1, wherein said first gear member is formed with a generally annular, inwardly facing, material contining trough, and the teeth of said first gear member are disposed within said trough.

9. An apparatus for applying a flowable material to a plurality of units, said apparatus comprising:
(a) a mounting frame,
(b) a rotor member mounted for rotational movement along a first generally transverse axis,
(c) said rotor member being formed with an annular, inwardly facing, material carrying trough,
(d) said rotor member having a plurality of interiorly facing gear teeth disposed within said trough, proximate pairs of which define respective material carrying recesses,
(e) said rotor member having about its periphery a plurality of injectors arranged in a predetermined pattern,
(f) said injectors each being formed with a relatively thin tip portion,
(g) each injector being formed with a through passage which reaches from a respective one of said material carrying recesses through the tip portion of each injector,
(h) a pinion gear member disposed within said rotor so as to be in meshing engagement with the teeth of said rotor member,
(i) said pinion gear being mounted for rotational movement about a second generally transverse axis spaced from said first axis, so that as teeth of said pinion gear come into meshing engagement with teeth of said rotor member, material is pushed out of the recesses of said meshing teeth through the related injectors,
(j) means to rotate said rotor at a predetermined rate of travel, and
(k) conveying means to carry said units in a predetermined arrangement corresponding to that of the injectors of said rotor and to move said units at a predetermined rate of travel corresponding to the linear peripheral rate of travel of said rotor member and in timed relationship therewith along a path proximate to said rotor member at a location thereof where said pinion gear meshes with teeth of said rotor member.

10. The apparatus as recited in claim 9, wherein there is arm means reaching from a place proximate a location along a path traveled by said injectors and extending generally along said path but slanting radially outward from the axis of rotation of said rotor, so as to be able to engage any of said units which remain on said injectors and push them off said injectors.

References Cited

UNITED STATES PATENTS

| | | | |
|---|---|---|---|
| 1,737,069 | 11/1929 | Barber | 107—1 |
| 2,625,119 | 1/1953 | Jennings | 107—1 |
| 2,851,003 | 9/1958 | Binsted et al. | 107—1 |
| 3,215,093 | 11/1965 | McKown et al. | 107—1 |

FOREIGN PATENTS 455,733   10/1936   Great Britain.

WALTER A. SCHEEL, *Primary Examiner.*

J. SHEA, *Assistant Examiner.*